United States Patent [19]
Le Floch

[11] Patent Number: 5,189,625
[45] Date of Patent: Feb. 23, 1993

[54] SYSTEM FOR CHECKING TOOL BREAKAGES ON A MACHINING CENTER

[75] Inventor: Daniel J. Le Floch, Saint Nazaire, France

[73] Assignee: Aerospatiale Societe Nationale Industrielle, Paris Cedex, France

[21] Appl. No.: 509,340

[22] Filed: Apr. 13, 1990

[30] Foreign Application Priority Data

Apr. 14, 1989 [FR] France .................. 89 04976

[51] Int. Cl.[5] .................. G06F 15/70; B23Q 17/09
[52] U.S. Cl. .................. 364/474.17; 364/474.21; 382/8
[58] Field of Search .................. 364/474.17, 478, 474.16, 364/474.19, 474.21, 474.34, 474.37; 356/237, 69; 358/101, 106, 107; 382/8, 18

[56] References Cited

U.S. PATENT DOCUMENTS

| | | | |
|---|---|---|---|
| 4,418,627 | 4/1990 | Garcia et al. | 364/474.17 |
| 4,497,029 | 1/1985 | Kiyokawa | 364/474.17 |
| 4,667,113 | 5/1987 | Nakajima et al. | |
| 4,807,145 | 2/1989 | Takahashi et al. | 364/474.17 |
| 4,869,813 | 9/1989 | Bailey et al. | 364/478 |
| 5,084,827 | 1/1992 | Demsey et al. | 364/474.37 |

FOREIGN PATENT DOCUMENTS

| | | |
|---|---|---|
| 0142990 | 5/1985 | European Pat. Off. . |
| 3501533 | 7/1986 | Fed. Rep. of Germany . |
| 2593103 | 7/1987 | France . |
| 153746 | 7/1986 | German Democratic Rep. . |
| 239369 | 9/1986 | German Democratic Rep. . |
| 1437145 | 5/1976 | Japan . |
| 0233403 | 9/1988 | Japan .................. 364/474.17 |
| 0045549 | 2/1989 | Japan .................. 364/474.17 |

OTHER PUBLICATIONS

Soviet Inventions Illustrated, Section Mécanique semaine 8842, abrégé No. 298535, p. 54, Nov. 1988.

Primary Examiner—David M. Malzahn
Assistant Examiner—Thomas E. Brown
Attorney, Agent, or Firm—Michael N. Meller

[57] ABSTRACT

The invention relates to a system for checking tool breakages on a machining center equipped with a numerically controlled machine tool (100) and a tool magazine (200), in which there are at least two cameras (401,402), processing and control means (600), the system thus making it possible to take photographs of tools intended to carry out the machining of a part in one or two planes, one photograph being taken prior to machining and the other afterwards, the photographs obtained then being compared in order to detect any abnormal conditions on the tools, the photographs taken by the second camera (402) being focussed on the basis of length information obtained with the photographs taken by the first camera.

11 Claims, 2 Drawing Sheets

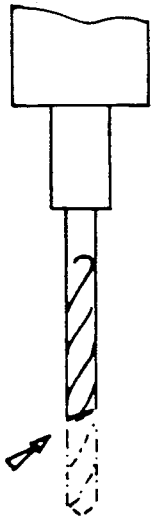
FIG. 2
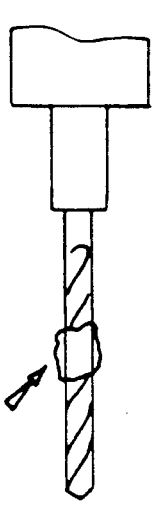
FIG. 3
FIG. 2a
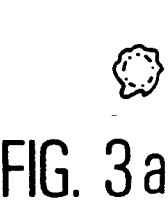
FIG. 3a
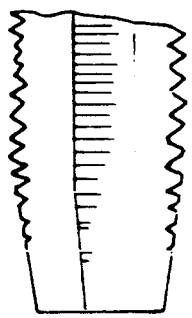
FIG. 4
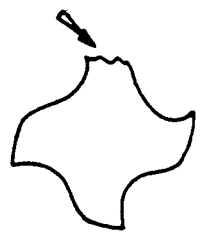
FIG. 4a
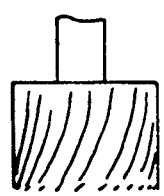
FIG. 5
FIG. 5a
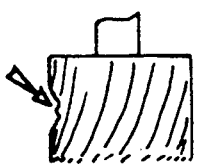
FIG. 5b

SYSTEM FOR CHECKING TOOL BREAKAGES ON A MACHINING CENTER

FIELD OF THE INVENTION

The invention relates to a system for checking tool breakages on a machining centre equipped with a numerically controlled machine and a tool magazine.

BACKGROUND OF THE INVENTION

Numerous methods exist, which make it possible to check tools used for machining parts. The object of the check is to automatically establish the state of the tools used for machining a part.

The various known methods for carrying out this check are referred to hereinafter.

A first method consists of mechanically sensing the tool using sensors. This method suffers from the disadvantage of only making it possible to measure the greatest length or the largest diameter of the tool. It does not make it possible in a simple manner to carry out a multicut tool check.

A second method consists of measuring the tool holder spindle power. However, the measurement of the spindle power is only significant for machining operations in materials of considerable strength or resistance using tools with an adequate diameter requiring an infeed of power, in such a way that power variations can be measured.

A third method consists of analyzing the vibration frequencies of the tool during machining. This method requires the placing of sensors in particular positions and the comparison of the sensed frequencies with those of a healthy tool during the same machining operation. Thus, beforehand a library is formed, which contains the different characteristics of the healthy tool and this library must be controlled.

A fourth method consists of carrying out ultrasonic measurements on the tool. These measurements require the use of specific sensors and a differential liquid.

Therefore the equipment is complex and difficult to use, because the equipment used for carrying out the checks must be withdrawable so as not to disturb the machining operations of the parts during the different machining cycles.

A fifth and final known method consists of carrying out a comparison of the machining of the tool with a predetermined model. For this purpose the system has a camera making it possible to take a picture of the tool after machining a part and processing means making it possible to compare the image obtained with a model stored in the memory. This method makes it necessary to form models of all the tools in the magazine and to produce a library containing all these models.

For elongated tools (drills, taps), a tool picture library takes up roughly one kbyte per tool and two kbyte per tool in the case of compact tools (milling cutters).

In general terms and in all the aforementioned methods, checking takes place by the comparison of certain characteristics of the tool following machining operations, relative to the same characteristics which have been predetermined for all the tools of the magazine and which are stored in a memory so as to constitute a library.

Apart from the disadvantages referred to hereinbefore and which apply to each of these methods, they also suffer from the disadvantage of making it necessary to produce a library, which is sometimes difficult to control and takes up a large amount of memory space.

SUMMARY OF THE INVENTION

The present invention relates to a system for checking tool breakages making it possible to solve all these problems, whilst having an entirely automatic nature, the checking phases being inserted between machining phases without any particular constraint.

The present invention relates to a tool breakage checking system based on the comparison of pictures of the tool and in which there is no need to produce a library of models.

The present invention more specifically relates to a system for checking tool breakages on a machining centre equipped with a tool magazine and a numerically controlled machine tool, said system having photographing means, processing means, control means and display means, characterized in that the photographing means are able to take pictures of each tool in the magazine in accordance with at least one first plane; the positioning control means can put into place the tool which will carry out the machining of a part and arrange the photographing means in such a way as to obtain at least one picture of said tool according to the first plane before and after the tool has machined the part; processing and control means able to process pictures obtained in order to carry out a comparison of these two pictures, supply a positive or negative checking signal as a function of the comparison result, allocate the tool to be checked to a first or a second class as a function of its morphological characteristics obtained by the processing of the picture of the tool prior to machining, producing a regulating signal on the basis of a first morphological characteristic of the tool and controlling and regulating the focussing of the photographing means on the basis of said regulating signal in order to take a picture before and after machining according to at least one second plane and as a function of the class to which the tool belongs.

According to an aspect of the invention, the photographing means comprise a first camera for taking pictures according to the first plane and at least one second camera for taking pictures according to a second plane substantially orthogonal to the first.

According to another aspect of the invention, the processing and control means carry out the same processing on the pictures taken before and after the tool has carried out a machining operation, said processing involving sampling and thresholding the picture signal in order to obtain a two-level, contrasted numerical image signal, one level corresponding to the black and one level to the white, calculation of the surface of the tool on the basis of each image, extraction of the contours of the tool, measurement of the length of the tool and comparison of the two images or pictures.

According to another aspect of the invention, the signal for regulating the focussing of the second camera constituting the photographing means is obtained from the measurement of the length of the tool.

According to another feature of the invention, the measurement of the length of the tool is obtained on the basis of the digitized image of the tool by counting the number of pixels between a reference point and the most remote pixel on the tool axis, or by calculating the end of the tool contour.

According to another feature of the invention, the calculation of the surface of the tool is obtained by counting the number of black or white pixels of an image or picture. According to another feature of the invention, the two pictures are compared by adding the two pictures taken before and after the machining operation, the second picture being reversed, counting the black or white pixels and comparing the number obtained with a maximum threshold S1 and a maximum threshold S2.

According to another feature of the invention, the comparison of the two pictures takes place after extraction of the contours of the tool and in this case only the contours of the tool are compared.

According to another feature of the invention, the comparison of the images or pictures also involves a phase of generating a signal indicating that the tool is in good state when the number obtained, after counting the black pixels, is between these two thresholds, a signal indicating that the tool is broken when the number exceeds the maximum threshold, a signal indicating that the tool has an abnormal condition when this number is below the minimum threshold.

According to another feature of the invention, the processing and control means, apart from measuring the tool length, carry out a measurement of its diameter and calculate the ratio between these two measurements, compare said measurement with a predetermined threshold and, as a function of the comparison result, control or do not control the photographs of the tool along the second plane.

BRIEF DESCRIPTION OF THE DRAWINGS

The invention is described in greater detail hereinafter with reference to the attached drawings, wherein show:

FIGS. 2,2a,3,3a,4,4a,5,5a,5b tool image or picture diagrams obtained by the system illustrating cases of breakages or abnormal conditions.

DESCRIPTION OF THE PREFERRED EMBODIMENT

Figure 1:
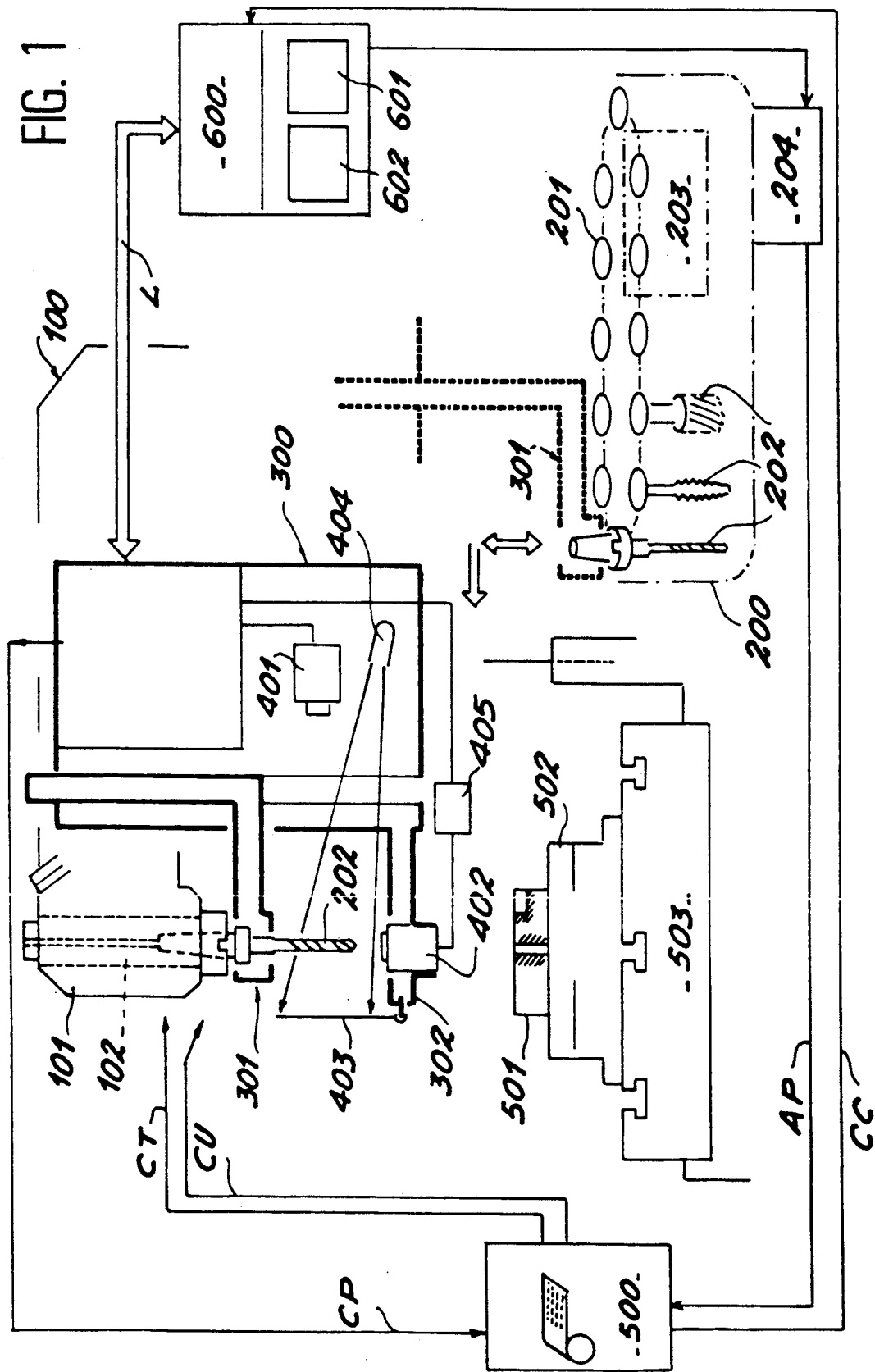
FIG. 1 the diagram of a tool break checking system according to the invention.

FIG. 1 is a diagram making it possible to illustrate the installation of a tool break checking system according to the invention on a machining centre equipped with a numerically controlled machine tool, the machine shown being in exemplified form a milling machine 100.

As has been described, the machining centre is equipped with a tool magazine 200 having a distribution chain 201 for tools 202 in which are located tools which are either new or considered as new and in which certain locations 203 are reserved for damaged tools. The chain is e.g. driven by a stepping motor 204.

Positioning control means make it possible to take a tool 202 from the magazine and place it on the rotary tool holder spindle 102 located in the head 101 of the milling machine.

These positioning control means are constituted by an automaton or automatic machine 300 equipped with known mechanisms, whereof one 301 constitutes a tool assembly-disassembly means.

The automaton 300 also has another means 302 which is retractable outside checking phases and which during the checking phases positions photographing means for taking pictures of the tool mounted on the milling machine.

According to an embodiment, the photographing means 401,402 are constituted by one, two and possibly three cameras (the third camera not being shown) making it possible to take photographs in accordance with different planes.

It is obviously possible to envisage a construction only having a single camera and in which a mechanism is provided making it possible to move said camera in order to obtain images according to different planes.

According to the embodiment described, a first camera 401 is provided for taking pictures along a first plane corresponding to a plane parallel to the axis of the tools.

A second camera 402 is provided for taking pictures, when this is necessary, along a second plane corresponding to a plane which is orthogonal to the first. This camera is associated with a conventional focussing control circuit 405. A third, not shown camera can be provided for taking local photographs of the tool, if this is necessary.

The numerical control drive is realized in conventional manner by a means 500, in which is recorded the machining program of the part 501 placed on the rotary plate 502 of the machining table 503.

Processing and control means 600, equipped with display screens 601,602 make it possible to give instructions to each means of the system, as well as to process and interpret the signals received.

There is also a means 404,403 for illuminating the tool in position.

The operation of the system will be described in greater detail hereinafter.

During a "normal" part maching phase, following the checking of the tool, the display and control means transmit an instruction for withdrawing the automaton 300 by a signal on line L, which triggers the transmission of a drive control signal CP. The drive program is performed and consequently supplies signals for controlling the head of the milling machine CT and the machining control CU. At each tool change, this program releases a checking control signal CC.

The control means 600 in the form of a computer communicate with the automaton by a series transmission line L over which travels all the control signals and the image signals from cameras 401,402.

A conventional communication protocol is established between the computer and the automaton, in order to establish a dialogue between the two means. Following the initialization of the two means by request of the computer (the latter being the master) and report from the automaton (slave), the dialogue can start.

The tool checking sequences take place on each tool change and possibly cyclically during a machining operation, which is in this case momentarily interrupted.

The program which drives the numerically controlled machine can be interrupted by stopping controls of means AP and controls for waiting for the end of the check supplied by the computer.

According to another embodiment, the machining program can provide cyclic interruptions of predetermined duration in order to permit checking phases. During a checking phase, the white screen 403 is put into place and the light spot illuminates the tool so as to obtain a clear contrast between the dark mass formed by the tool with respect to the screen.

The first camera 401 takes a first picture of the tool 202 prior to machining, said tool coming from the magazine and being considered as in good state. The picture obtained is in a plane in accordance with the tool axis.

Optionally, during machining and certainly at the end of a machining operation, said same camera takes a second picture in the same plane (the camera not being moved). The image or picture signals are transmitted after each picture to the processing means 600, which digitize said signal and process it in order to carry out a comparison of the pictures in order to determine whether the tool used has an abnormal condition, if it has undergone a lengthwise breakage, if its teeth are broken, or if there is a blockage.

The computer is programmed so as to process the pictures obtained in order to carry out a comparison thereof, supply a positive or negative checking signal as a function of the comparison result, allocate the tool to be checked to a first class or to a second class as a function of its physical characteristics, produce a regulating signal on the basis of a first physical characteristic of the tool and control and regulate the focussing of the second camera on the basis of said regulating signal in order to take a picture before and after machining according to the second plane, in the case where the tool belongs to the second class (class of compact tools).

In a more detailed manner, the image processing involves the acquistion of the picture by the camera and the transmission of the corresponding picture signal to the computer, sampling and thresholding the picture signal in such a way as to obtain a two-level digital signal, one level corresponding to the black and one to the white, calculating the surface of the tool on the basis of each picture signal, extraction of the contours of the tool, measurement of the length of the tool and comparison of the two pictures taken before and after machining.

These processing operations are the same, no matter whether the picture signal comes from one or the other camera. The focussing regulating signal of the second camera is obtained from the measurement of the tool length. The pictures by the second camera are consequently dependent on the measurements obtained from the signals from the first camera.

Pictures relating to tool details which could be obtained from a third camera could in the same way be made dependent on the measurements obtained by the second camera.

The length of the tool is obtained on the basis of the digitized image or picture thereof (before and after machining) by counting the number of black pixels (dots). This count is carried out between a reference point and the most remote black pixel on the tool axis. This length can also be obtained by calculating the end of the tool contour. The calculation of the surface is obtained by counting the number of black (or white) pixels of the picture.

The two pictures are compared by adding two pictures taken before and after machining, the second picture having been reversed (contrast reversal), counting the black (or white) pixels and comparison of the number obtained with a maximum threshold S1 and a minimum threshold S2.

The comparison of the two pictures can also take place after extraction of the contours by a conventional contour extraction algorithm and then by comparing the contours. The contours can also be compared by counting. The comparsion of the pictures also involves a phase of generating a signal indicating whether or not the tool is in good condition.

According to the considered example, a tool is considered to be in good condition when the number obtained after counting is between the two thresholds. A tool is considered to have an abnormal condition when this number is below the minimum threshold. A tool is considered to be broken when this number exceedsthe maximum threshold.

For elongated tools (drills, taps, reamers, etc.), breakage is generally revealed by a lack of length, so that it is sufficient for a picture to be taken along a plane following the tool axis. However, for compact tools (milling cutters), partial breaks are more frequent and in this case pictures are taken in accordance with two orthogonal planes.

The placing in one or other of these classes, in order to reduce the number of checks, is e.g. obtained by measuring the tool diameter, in addition to its length. A calculation is then made of the ratio between these two quantities and this is compared with a predetermined threshold. As a function of the comparison results, photography by the second camera is initiated.

Different pictures making it possible to illustrate certain abnormal conditions detected by the system according to the invention are shown in FIGS. 2,2a,3, 3a,4,4a,5,5a and 5b.

FIG. 2 illustrates the case of a broken drill and a picture by camera 401, along the drill axis, makes it possible to reveal this break.

FIG. 2a is a photograph along a plane orthogonal to this axis and is obtained by camera 402, but is unnecessary in the case of the drill.

FIG. 3 illustrates the case of a blockage on a drill. FIG. 3a is a photograph taken by camera 402.

FIG. 4 illustrates the case of a tap having an abnormal condition. A picture by camera 401, along the tap axis reveals this abnormal condition.

FIG. 4a is a view along a plane orthogonal to said axis and is obtained by camera 402.

FIGS. 5,5a and 5b show milling cutters. The abnormal condition which can be detected by the system are illustrated by FIGS. 5a and 5b.

I claim:

1. System for checking tool breakages on a machining center equipped with a tool magazine and a numerically controlled machine tool, said system having photographing means, processing means, control means and display means, said system comprises a first camera for taking pictures of each tool in the magazine in accordance with at least one first plane; positioning control means for putting into place the tool which will carry out the machining of a part and arrange said first camera for obtaining at least one picture of said tool according to said first plane both before and after said tool has machined said part; processing and control means for processing pictures obtained by said first camera to carry out a comparison of these two pictures, supplying a positive or negative checking signal as a function of the comparison result, allocating said tool to be checked to a first or a second class as a function of its physical characteristics obtained by the processing of the picture of said tool prior to machining, and producing a regulating signal on the basis of a first physical characteristic of the tool and if necessary, controlling and regulating the focussing of a second camera on the basis of said regulating signal in order to take a picture both before and after machining to at least one second plane perpendicular to said first plane and as a function of the class to which the tool belongs.

2. System as in claim 1, wherein the processing and control means carry out the same processing on the pictures taken before and after the tool has carried out a machining process, said processing involving the sampling and thresholding of the picture signal in order to obtain a digital picture signal contrasted with two levels, one level corresponding to the black and the other to the white, calculating the surface of the tool on the basis of each picture, extraction of the contours of the tool, measuring the length of the tool and comparison of the two pictures.

3. System as in claim 1, wherein said processing and control means produces said signal for regulating the focussing of said second camera on the basis of the measurement of the tool length.

4. System as in claim 3, wherein said processing and control means carries out the measurement of the tool length from the digitalized picture of the tool by counting the number of pixels between a reference point and the most remote pixel on the tool axis.

5. System as in claim 2, wherein said processing and control means carries out the calculation of the tool surface by counting the number of black (or white) pixels of a picture.

6. System as in claim 2, wherein said processing and control means carries out the comparison of said two pictures by adding two pictures taken respectively before and after the machining operation, the second picture being reversed, counting the number of black (or white) pixels and comparing the number obtained with a maximum threshold S1 and a minimum threshold S2.

7. System as in claim 2, wherein said processing and control means carries out said comparison of said two pictures after extracting the contours of the tool and in this case only the contours of the tool are compared.

8. System as in claim 1, wherein said processing and control means measures said tool length and said tool diameter, calculates the ratio between these two measurements, compares said ratio with a predetermined threshold and, if necessary, as a function of the comparison result, controls the taking of pictures of the tool along the second plane.

9. System as in claim 7, wherein said processing and control means carries out said comparison of said pictures by generating a signal indicating that the tool is in good condition when the number obtained after counting the black pixels, is between said two thresholds, generating a signal indicating that the tool is broken when the said number is above said maximum threshold and generating a signal indicating that the tool has an abnormal condition when said number is below said minimum threshold.

10. System as in claim 2, wherein said processing and control means measures said tool length and said tool diameter, calculates the ratio between these two measurements, compares said ratio with a predetermined threshold and, if necessary, as a function of the comparison result, controls the taking of pictures of the tool along the second plane.

11. System as in claim 6, wherein said processing and control means carries out said comparison of said pictures by generating a signal indicating that the tool is in good condition when the number obtained after counting the black pixels, is between said two thresholds, generating a signal indicating that the tool is broken when the said number is above said maximum threshold and generating a signal indicating that the tool has an abnormal condition when said number is below said minimum threshold.

* * * * *